Aug. 30, 1932.   E. I. SPONABLE   1,874,712
COMBINED MOVING PICTURE AND SOUND CAMERA
Filed Jan. 17, 1929   3 Sheets-Sheet 1
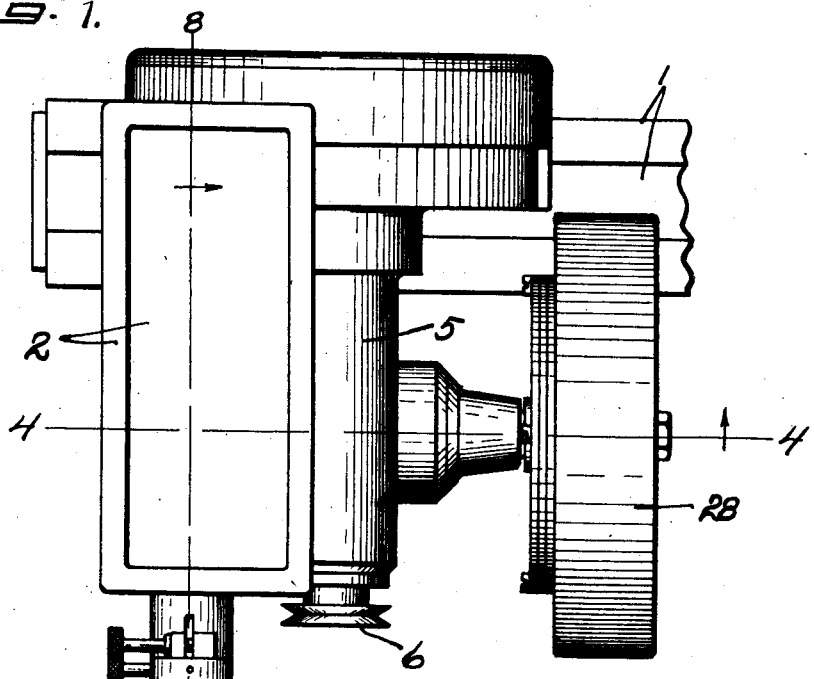
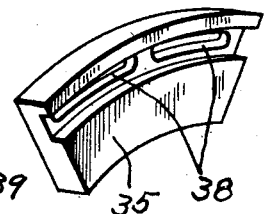
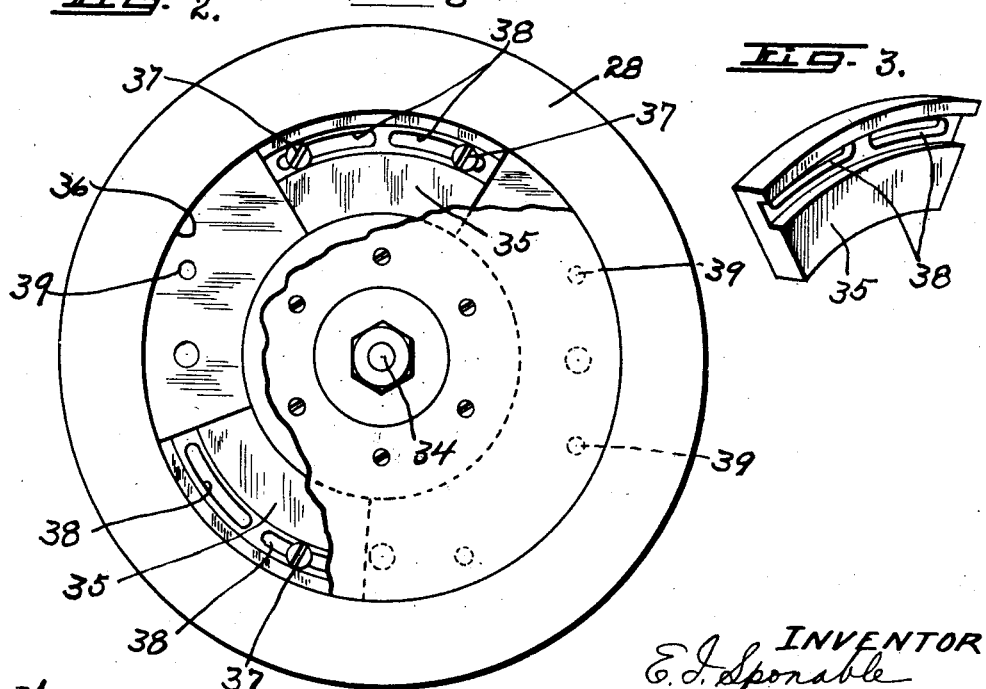
WITNESS
INVENTOR
E. I. Sponable
BY Denison and Thompson
ATTORNEYS.

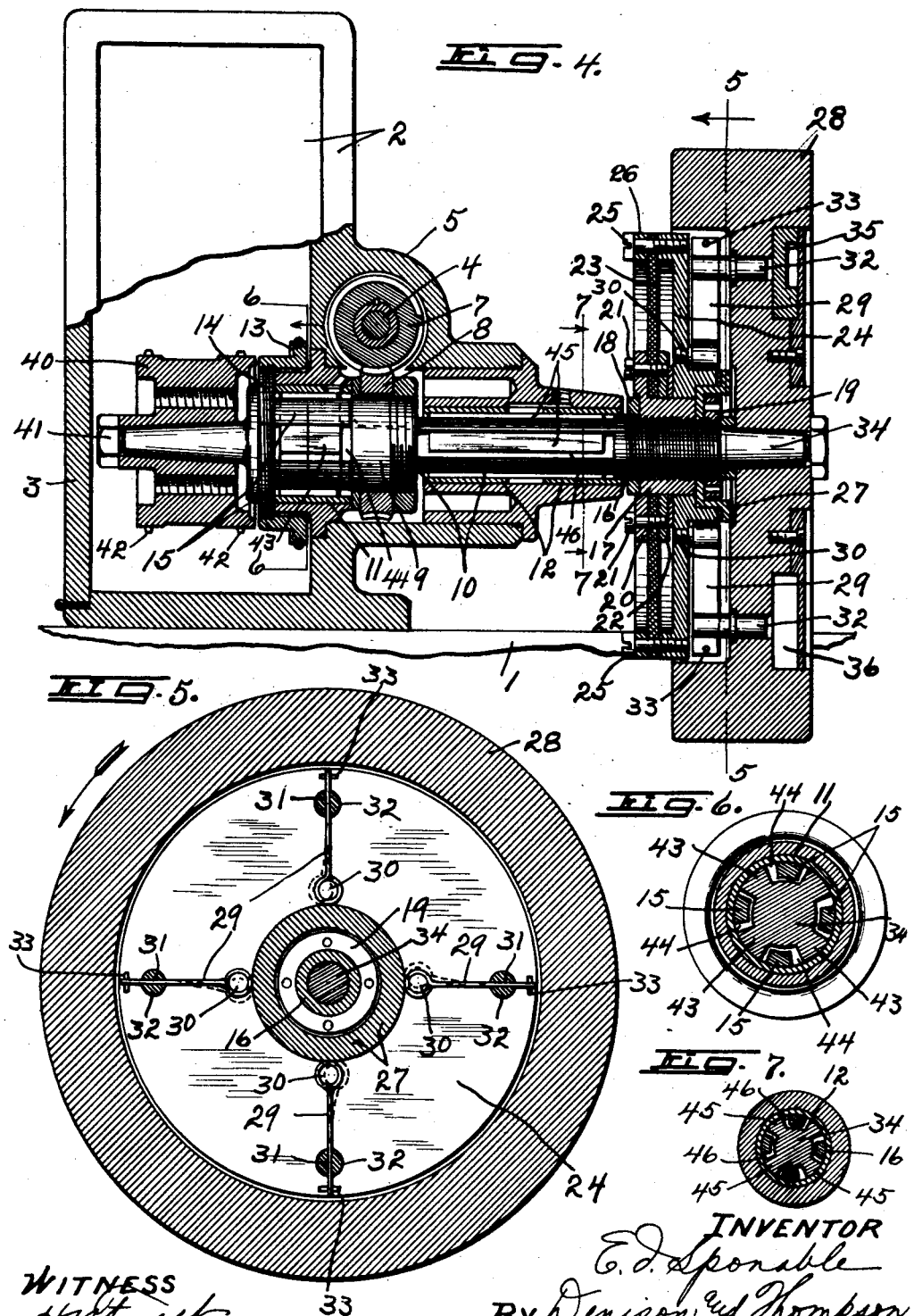

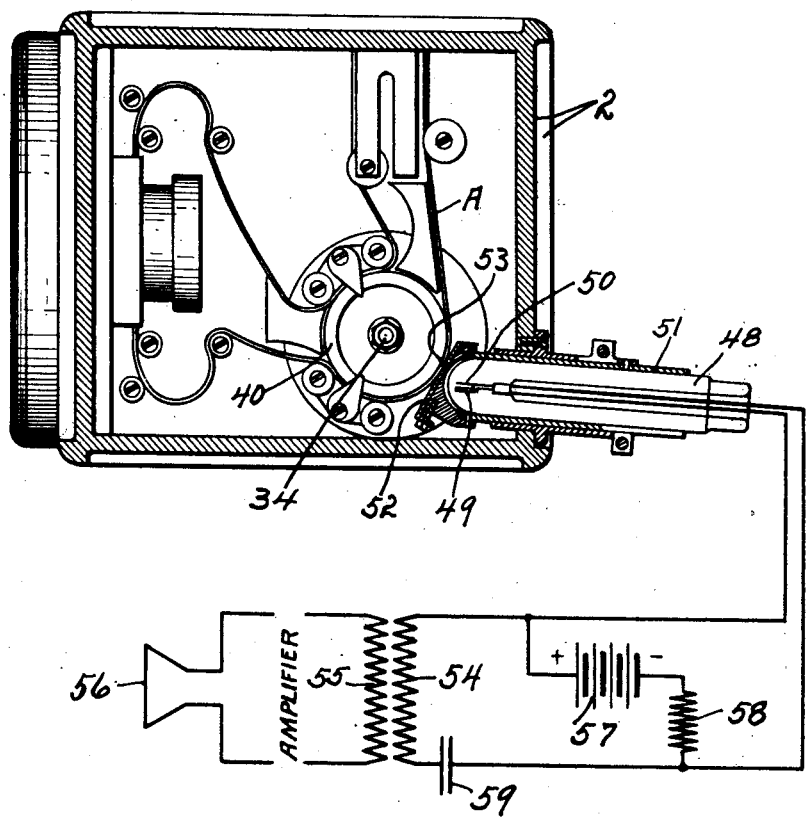

Patented Aug. 30, 1932

1,874,712

UNITED STATES PATENT OFFICE

EARL I. SPONABLE, OF NEW YORK, N. Y., ASSIGNOR TO FOX CASE CORPORATION, OF NEW YORK, N. Y., A CORPORATION OF NEW YORK

COMBINED MOVING PICTURE AND SOUND CAMERA

Application filed January 17, 1929. Serial No. 334,807.

This invention relates to certain new and useful improvements in combined moving pictures and sound cameras.

In the usual moving picture camera in which the shutter shaft is directly driven from any suitable source of power and the feed and take-up sprocket shaft is driven by suitable gearing from the shutter shaft the sprocket shaft is affected by any irregularities in the movement of the shutter-shaft and thereby injuriously affects the production of an accurate and perfect sound record upon the sensitized film surface as the film is being moved around the feed and take-up sprocket.

The main object of this invention is to provide a filtering driving connection between the shutter-shaft and the sprocket-shaft in the usual moving picture camera so that any mechanical pulses or irregularity in the movement of the shutter-shaft will not be transmitted to the sprocket-shaft, thereby maintaining a uniform or equal velocity of the sprocket-shaft together with the feed and take-up sprocket mounted thereon.

This steady, smooth and uniform rotary movement of the sprocket is particularly desirable and necessary when a sound picture, that is, a picture of light wave variations as produced by electrical variations conforming to sound wave variations, is being taken while the moving picture film or sensitized surface is moved around and in contact with the feed and take-up sprocket.

Other objects and advantages relating to the details of the structure and the form, and relation of the parts thereof, will more fully appear from the following description, taken in connection with the accompanying drawings, in which:

Figure 1 is a top plan view of a motion picture camera embodying the various features of my invention.

Figure 2 is an outer face view of the flywheel having the cover-plate, partially broken away to better illustrate the counterweights clamped thereto.

Figure 3 is a perspective view of one of the counter-weights.

Figure 4 is a vertical cross section taken on the line 4—4, Figure 1.

Figure 5 is a detail sectional view taken in the plane of the line 5—5, Figure 4.

Figure 6 is a detail section taken on the line 6—6, Figure 4.

Figure 7 is a detail section taken on the line 7—7, Figure 4.

Figure 8 is a section on the plane of the line 8—8, Figure 1, illustrating the position at which the sound record is produced.

The apparatus consists of a base —1— upon which is mounted the camera case —2— which is of a rectangular box shape having a door —3— hinged to its front side, while a shutter-shaft —4— is journaled in a horizontal cylindrical case —5— cast or otherwise secured to the rear side of the camera case —2—.

The shutter shaft —4— may be driven in any suitable manner as by a motor connected by a belt, not shown, to the grooved pulley —6— mounted in the usual manner on the outer rear end of the shutter-shaft —4—.

Keyed or otherwise secured to the shutter-shaft —4— and positioned a short distance ahead of the rear end thereof is a worm —7— which meshes with and drives a worm-gear —8— keyed or otherwise secured to an enlarged intermediate portion —9— of a hollow drive shaft —10— rotatably mounted in bearings —11— and —12— carried by the rear side wall of the camera case —2—.

A take-up pulley —13— is secured to an enlarged annular flange —14—located at the inner end of the hollow-drive shaft —10— and positioned just inside the bearing —11—. The take-up pulley —13— is positioned just inside the rear wall of the case —2— and rotates with the hollow shaft —10—.

Between the flange —14— and the worm gear supporting portion —9— of the hollow drive shaft —10— is a bearing portion —15— adapted to be rotatably mounted in the forward bearing —11— and in this instance is slightly greater in diameter than the gear carrying portion —9— but of less diameter than the flange —14—.

The remaining portion —16— of the hollow drive shaft —10— extending from the portion —9— rearwardly is of somewhat less diameter than said portion —9— and extends a sufficient distance beyond the outer end of the bearing —12— in which it is rotatably mounted to permit a drive collar —17— to be adjustably mounted thereon and may be locked in the adjusted position to the hollow shaft —10— so as to rotate with said shaft by means of the lock nuts —18— and —19— threaded on the outer end of the hollow shaft —10— and located one on each side of the collar —17—.

The drive collar —17— may be provided with an outwardly extending annular flange —20— to which is secured, by means of the screws —21— and the annular ring or washer —22—, a comparatively thin yielding drive plate or disk —23— composed of some flexible material such as fabric treated with rubber, as, for instance, rubber belting or any other suitable material or composition of materials so as to form a yielding driving connection between the drive collar —17— and a drive ring —24— to which the drive plate —23— is secured at its periphery by means of the screws —25— which pass through suitable holes provided in the annular clamping ring —26— positioned at the outer face of said drive plate and passing through similar registering holes in the drive plate —23— are threaded to adjacent portions of the drive ring —24—.

The drive ring —24—, in this instance, consists of a metallic circular disk of substantially the same diameter as the drive plate —23— and is rotatably mounted at its base upon the drive collar —17— and is held in its position thereon by the retaining ring —27— which is clamped between the rear face of the drive collar —17— and the lock nut —19—.

The drive ring —24— is yieldingly connected to the fly-wheel —28— by a plurality of, in this instance, four spring bars —29— which are secured at their inner ends to studs or pins —30— fastened to the drive ring —24— near its center. The spring bars —29— extend radially outward from the studs —30— and are slidably mounted in grooves or slots —31— in the outer end of studs —32— secured to the fly-wheel —28— at some distance from the studs —30—. Each of the spring bars —29— may also be provided with stop pins —33— secured near the outer end thereof to limit the inner travel of said spring bars through the slots —31— in their respective studs —32—.

Any rotating movement of the hollow shaft —10— is transmitted to the collar —17— and thence through the yielding drive plate —23— to the drive ring —24— which, in turn, drives the fly-wheel and the sprocket shaft —34— upon which said fly-wheel is mounted, through the medium of the flexible spring bars —29— and the studs —30— and —32—, thus producing a driving mechanism which affords a very flexible yielding connection between the drive shaft —10— and the sprocket shaft —34— and at the same time absorbing or filtering any irregularity of movement or mechanical pulses which otherwise would be transmitted to the drive shaft —10— due to any irregularity of the driving means, or lost motion in the driving gears, to any varying air pockets adjacent the shutter shaft or for any other reason.

The fly-wheel —28— may also be provided with one or more counter weights —35— which may, as shown, be placed in an annular groove —36— provided in the outer face of said fly-wheel and adjustably secured in the set position by screws or bolts —37— passing through elongated slots —38— in the counter-weights —35— and threaded in tapped holes —39— provided at intervals in the fly-wheel —28—.

It has been found in practice that there is a tendency of an irregular unequal movement to be developed in the fly-wheel due to the yielding flexible nature of the drive springs —29— especially during the starting or accelerating period and that by positioning one or more counter-weights —35—, as previously described, at certain locations on the fly-wheel that this irregular movement of said fly-wheel and, the parts driven thereby are overcome, with the result that the sprocket shaft —34— and the feed and take-up sprocket —40— secured to the inner end of said sprocket shaft are rotated at a uniform or equal velocity which is very desirable and necessary when a sound record is being produced upon the sensitized film surface as the film is being moved around said feed and take-up sprocket.

The sprocket drive shaft —34—, as previously indicated, has the fly-wheel —28— secured in any suitable manner to the outer rear end thereof and extends forward therefrom through the hollow shaft —10— with the forward end thereof terminating within the camera case —2— beyond the front inner end of the hollow shaft —10—.

The forward end of the sprocket shaft —34—is tapered, in this instance, to receive the drive and take-up sprocket —40— which may be secured to said sprocket shaft in any suitable manner as by the nut —41— forcing the sprocket securely upon the tapered portion of said sprocket shaft for simultaneous rotation therewith.

The sprocket —40— may consist of a cylinder formed with spaced rows of teeth —42— upon the periphery thereof for engaging the usual openings in a moving picture film.

The sprocket shaft —34—, in this instance, is loosely mounted in the hollow shaft —10— and slightly spaced from the inner wall thereof for the purpose of preventing any friction between the two shafts so there will be no tendency of the sprocket shaft —34— being driven directly by the hollow shaft —10— instead of through the medium of the flexible filtering driving means which consists of the driving plates —23— and —24— and the fly-wheel —28— as before explained.

A plurality of, in this instance, four, longitudinal radial flanges or lugs —43— are spaced circumferentially from each other and secured to or integral with that portion of the sprocket shaft which is normally positioned within the bearings —11—. The lugs —43— extend through cooperating longitudinal radial slots or apertures —44— located in the adjacent portion of the hollow shaft —10—. The slots —44— are preferably of greater width than the flanges —43— as indicated in Figure 6 so as to permit of a certain amount of relative circumferential movement of the two shafts without interfering with the free movement of each other.

The diameter of the lugs —43— is the same as that of the adjacent portion of the hollow shaft —10— or, in other words, the diameter of the lugs —43— is such as to permit said lugs to be rotatably mounted in the bearings —11— in which they are journaled.

In like manner the forward end of the sprocket shaft —34— is journaled in the bearing —12— by means of a plurality of, in this instance four, longitudinal radial lugs or flanges —45— integral with or secured to that portion of the sprocket shaft —34— which is normally positioned within the bearing —12—, said lugs or flanges being spaced circumferentially apart and extend through cooperating slots or apertures —46—, Figure 7, located in the adjacent portion of the hollow shaft —10—, said slots or apertures being of somewhat greater width than the lugs —45— so as to permit of a given amount of relative circumferential movement of the two shafts without in any way interfering with the free movement of each other. The lugs —45— are of the same diameter as the adjacent portion of the hollow shaft —10— and are journaled in the bearing —12—.

It may now be clearly understood how that the two shafts —10— and —34— are positioned one within the other and that both of said shafts are journaled in the same bearings and at the same time each shaft has a given amount of circumferential movement in relation to the other shaft without in any way interfering with the free movement of each other due to a lack of any friction between said shafts.

In Figure 8 I have indicated a structure suitable for the production of a sound record upon the sensitized film surface as the film is being moved around the feed and take-up sprocket —40—. It consists of a source of light, as a lamp —48— including two spaced electrodes —49— and —50— enclosed in an adjustable casing —51— penetrating the rear end wall of the camera case —2— and is provided at its front end with a plate —52— disposed tangential to the feed and take-up sprocket —40— and having a narrow elongated slit —53— through which light from the lamp —48— can pass to the film —A—.

The lamp or source of light —48— is modulated in accordance with sound waves so that the record produced on the film while moving around the feed and take-up sprocket —40— will conform to said sound waves in any suitable manner, as by connecting the electrodes —49— and —50— in circuit with the primary —54— of a transformer, the secondary —55— of which through any number of stages of amplification is connected in circuit with a microphone —56—. The source of light is maintained constantly lighted, as by means of a battery —57— connected across the primary —54— of the transformer and a resistance —58— may be provided, if desired.

In order to prevent the lighting current from following through the primary —54— of the transformer a condenser —59— may be provided.

As before stated it is essential that the film shall move in a regular and uniform manner while the sound record is being produced if an accurate, sharply defined record is to be produced, and it is this fact that necessitates the driving of the feed and take-up sprocket in a steady and uniform manner in order that the film may be carried past the slit —53— regularly, steadily and uniformly and this is accomplished by the yielding driving connection between the hollow drive shaft and fly-wheel in the manner hereinbefore described.

Although I have shown and particularly described the preferred embodiment of my invention, various changes may readily be made without departing from the spirit of this invention as set forth in the appended claims.

I claim:

1. In a combined moving picture and sound camera, a driving shaft, a driven shaft and connections for driving the driven shaft from the driving shaft including a flexible disk operatively connected to the driving shaft, a ring connected to the flexible disk, a fly-wheel mounted on the driven shaft and a plurality of spring members constituting the driving connection between the ring member and the flywheel said spring members extending radially of the disk.

2. In an apparatus of the class described, a tubular shaft, a sprocket shaft within the tubular shaft, a bearing in which both of said shafts are journaled and driving connections between the tubular shaft and the sprocket shaft including a flexible disk operatively connected to the tubular shaft, a ring member operatively connected to the flexible disk, a flywheel mounted on the sprocket shaft, and means for driving the flywheel from said ring member.

3. In an apparatus of the class described, a tubular shaft, a sprocket shaft within the tubular shaft, a bearing in which both of said shafts are journaled and driving connections between the tubular shaft and the sprocket shaft including a flexible disk operatively connected to the tubular shaft, a ring member operatively connected to the flexible disk, a flywheel mounted on the sprocket shaft, and means for driving the flywheel from said ring member including a plurality of resilient members.

4. In an apparatus of the class described, a tubular shaft, a sprocket shaft within the tubular shaft, a bearing in which both of said shafts are journaled, and driving connections between the tubular shaft and the sprocket shaft including a flexible disk operatively connected to the tubular shaft, a ring member operatively connected to the flexible disk, a flywheel mounted on the sprocket shaft, and means for driving the flywheel from said ring member including a plurality of resilient members positioned in the space between the ring member and the flywheel.

5. In an apparatus of the class described, a driving shaft, a sprocket shaft driven therefrom, driving connections between said shafts including a plurality of spring members radially disposed with respect to the sprocket shaft, a flywheel mounted on the sprocket shaft, connections between said spring members and said flywheel, and a driving connection between said driving shaft and said spring members including a flexible disk coaxial with said sprocket shaft.

In witness whereof I have hereunto set my hand this 5th day of January 1929.

EARL I. SPONABLE.